(12) United States Patent
Onaka et al.

(10) Patent No.: US 6,747,724 B2
(45) Date of Patent: Jun. 8, 2004

(54) LIQUID CRYSTAL DISPLAY DEVICE HAVING NON-DISPLAY AREA WITH REDUCED WIDTH

(75) Inventors: Eiichi Onaka, Hino (JP); Shinichi Kato, Higashiyamato (JP); Katsumi Kitagawa, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 272 days.

(21) Appl. No.: 09/910,752

(22) Filed: Jul. 23, 2001

(65) Prior Publication Data

US 2002/0030784 A1 Mar. 14, 2002

(30) Foreign Application Priority Data

| Jul. 26, 2000 | (JP) | ........................................ 2000-224797 |
| Sep. 25, 2000 | (JP) | ........................................ 2000-289986 |
| Feb. 15, 2001 | (JP) | ........................................ 2001-037808 |

(51) Int. Cl.$^7$ ...................... G02F 1/1345; G02F 1/1339
(52) U.S. Cl. ........................ 349/149; 349/153; 349/190
(58) Field of Search ............................... 349/149, 153, 349/190

(56) References Cited

U.S. PATENT DOCUMENTS

| 5,680,192 A | | 10/1997 | Burrell et al. |
| 5,689,352 A | | 11/1997 | Kishigami |
| 5,777,713 A | * | 7/1998 | Kimura ........................ 349/156 |
| 5,831,710 A | * | 11/1998 | Colgan et al. ................ 349/156 |
| 6,034,757 A | | 3/2000 | Yanagawa et al. |
| 6,078,379 A | | 6/2000 | Nagae et al. |
| 6,104,462 A | * | 8/2000 | Kabushiki et al. ........... 349/138 |
| 6,407,783 B1 | * | 6/2002 | Ohgawara et al. .......... 349/110 |
| 6,473,147 B1 | * | 10/2002 | Nakahara et al. ........... 349/153 |

FOREIGN PATENT DOCUMENTS

| EP | 0 380 311 A1 | | 8/1990 |
| JP | 407104281 A | * | 4/1995 |
| WO | WO 99/52011 A | | 10/1999 |

OTHER PUBLICATIONS

Patent Abstracts of Japan, vol. 1999, No. 13, Nov. 30, 1999 and JP 11–223829 A (Seiko Epson Corp.), Aug. 17, 1999—Abstract only.

* cited by examiner

Primary Examiner—Julie-Huyen L. Ngo
(74) Attorney, Agent, or Firm—Frishauf, Holtz, Goodman & Chick, P.C.

(57) ABSTRACT

Right end portions of upper half lines in the scanning signal lines are connected to a semiconductor integrated circuit device via leading lines provided on a right side thereof, and left end portions of lower half lines in the scanning signal lines are connected to a semiconductor integrated circuit device via leading lines provided on a left side thereof. Therefore, the size of a liquid crystal display device in a widthwise direction thereof can be reduced. Also, since crossing points of the leading lines connected to the scanning signal lines are arranged outside the right side edge portion and a left side edge portion of a light shielding film, such a drawback can be prevented from occurring that ionic impurities eluted from the sealing member due a potential difference between the leading lines and the light shielding film corrode the leading lines.

6 Claims, 12 Drawing Sheets

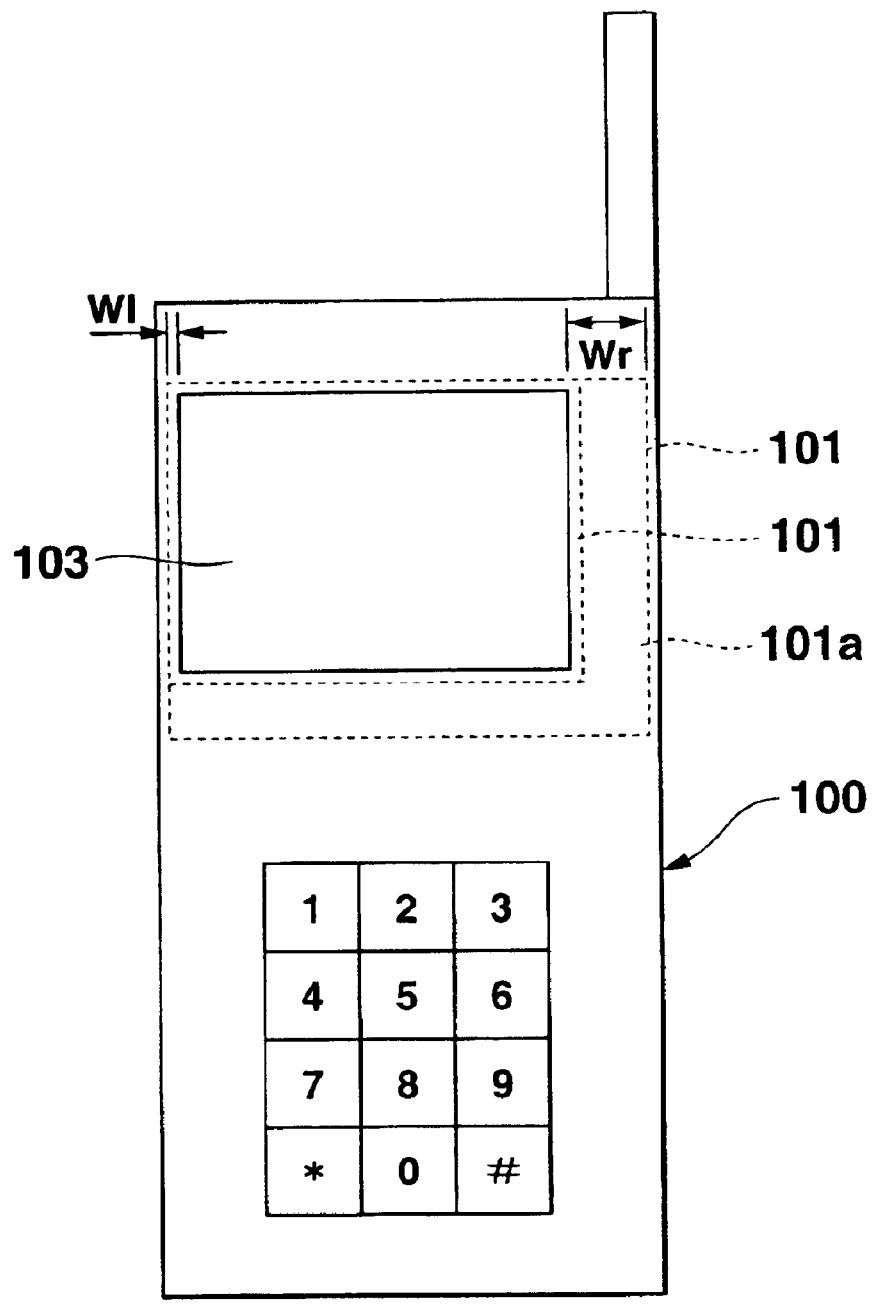

LIQUID CRYSTAL DISPLAY DEVICE HAVING NON-DISPLAY AREA WITH REDUCED WIDTH

CROSS-REFERENCE TO RELATED APPLICATIONS

This application is based upon and claims the benefit of priority from the prior Japanese Patent Applications No. 2000-224797, filed Jul. 26, 2000; No. 2000-289986, filed Sep. 25, 2000; and No. 2001-037808, filed Feb. 15, 2001, the entire contents of all of which are incorporated herein by reference.

BACKGROUND OF THE INVENTION

1. Field of the Invention

The present invention relates to a liquid crystal display device, and in particular to a liquid crystal display device which is suitable for a portable telephone, a mobile electronic equipment such as a PDA (Personal Digital Assistance), or the like and where the width of a non-display area can be reduced.

2. Description of the Related Art

FIG. 11 is a plan view of one example of a conventional active matrix type liquid crystal display device. This liquid crystal display device is structured such that an active substrate 101 and an opposing substrate 102 positioned above the active substrate 101 are bonded to each other through a rectangular frame-shaped sealing member (not shown) and liquid crystal (not shown) is sealed inside the sealing member between both the substrates 101 and 102. In this case, the right side portion and the lower side portion of the active substrate 101 project beyond the opposing substrate 102. Hereinafter, these projecting portions are referred to as a right side projecting portion 101a and a lower side projecting portion 101b. Also, the sealing member is arranged along side edge portions of four sides of the active substrate 101 outside a display area 103 shown with a double-dotted chain line.

In the display region 103 on the active substrate 101, only one representative scanning signal line and one representative data signal line are illustrated in FIG. 11, but it is well-known that a plurality of scanning signal lines 104 and a plurality of data signal lines 105 are provided so as to extend in a row direction and in a column direction, respectively. Thin film transistors (not shown) and pixel electrodes (not shown) driven by the thin film transistors are disposed near crossing points of both the lines 104 and 105 in a matrix manner.

The right side end of each scanning signal line 104 is connected via a leading line provided on a right side thereof to an output side connecting terminal (not shown) of a semiconductor integrated circuit device 107 shown with a dotted line and mounted on the right side projecting portion 101a of the active substrate 101. Also, an lower end portion of each data signal line 105 is connected via a leading line 108 provided on a lower side thereof to an output side connecting terminal (not shown) of a semiconductor integrated circuit device 109 mounted on the lower side projecting portion 101b of the active substrate 101. In FIG. 11, only two of each of the leading wires 106 and the leading lines 108 which are positioned on both ends are illustrated.

The semiconductor integrated circuit device 107 serves so as to supply scanning signals to the scanning lines 104 and the semiconductor integrated circuit device 109 serve so as to supply data signals to the data signal lines 105. Joined to a right side portion on the lower side portion of the active substrate 101 is one end portion of a flexible wiring board 110. Then, input side terminals of the semiconductor integrated circuit devices 107 and 109 are connected to the flexible wiring board 110 via wiring (not shown) provided on respective portions of the active substrate 101.

However, in such a conventional liquid crystal display device, particularly, since the semiconductor integrated circuit device 107 is mounted on the right side projecting portion 101a of the active substrate 101, the width Wr of a non-display area on region outside the right side of the display area 103 is larger than the width W1 of a non-display area outside the left side of the display area so that a basic shape becomes asymmetrical left and right. For this reason, in a case of a portable telephone with such a liquid crystal display device, as shown in FIG. 12, the position of the display area 103 is shifted to the left side of a portable telephone main body 100, which results in deterioration in design. Also, the size of the active substrate 101 along left and right directions (widthwise direction) becomes relatively large and the size of the portable telephone main body 100 along the widthwise direction also becomes relatively large, which results in lack in portability. Incidentally, the width of the right side projecting portion 101a of the active substrate 101 requires 5 to 10 mm or so.

BRIEF SUMMARY OF THE INVENTION

An object of the present invention is to reduce the width of a non-display area of a liquid crystal display device along both left and right directions (widthwise direction), thereby reducing the size of the entire liquid crystal display device along the widthwise direction.

According to this invention, there is provided a liquid crystal display device comprises:

an opposing substrate;
an active substrate which has a plurality of scanning signal lines, a plurality of data signal lines formed in a direction perpendicular to the scanning signal lines and a plurality of leading lines connected to corresponding scanning signal line, and which has a face opposed to the opposing substrate and one side portion which is not opposed to the opposing substrate;
a frame-shaped sealing member bonding the active substrate and the opposing substrate to each other;
liquid crystal disposed inside a region defined by the active substrate, the opposing substrate and the sealing member; and
a frame-shaped light shielding film which is formed on the opposing substrate and which defines a display area, wherein
the sealing member has a pair of side portions which are generally perpendicular to the scanning signal lines,
the leading lines are formed along respective side portions of the sealing member, and at least partial lines of the leading lines are formed in a portion overlapping with a side portion of the sealing member, and
a semiconductor integrated circuit connected to the data signal lines and the leading lines is mounted on one side potion of the active substrate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 12 is a front view of a portable telephone provided with the liquid crystal display device shown in FIG. 11.

DETAILED DESCRIPTION OF THE INVENTION

First Embodiment

Figure 1:
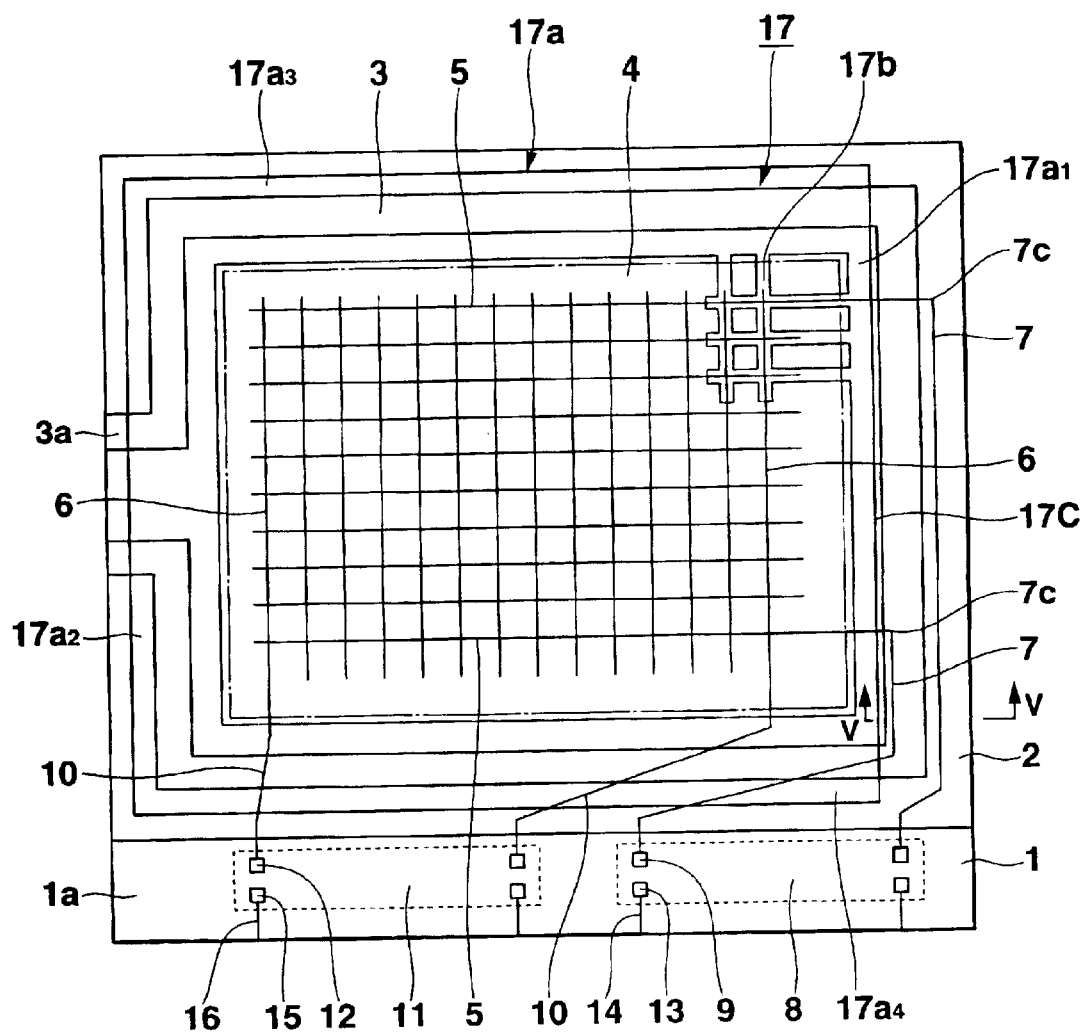
FIG. 1 is a transparent plan view showing a main portion of a liquid crystal display device according to a first embodiment of the present invention in an equivalent circuit manner.
Figure 5:
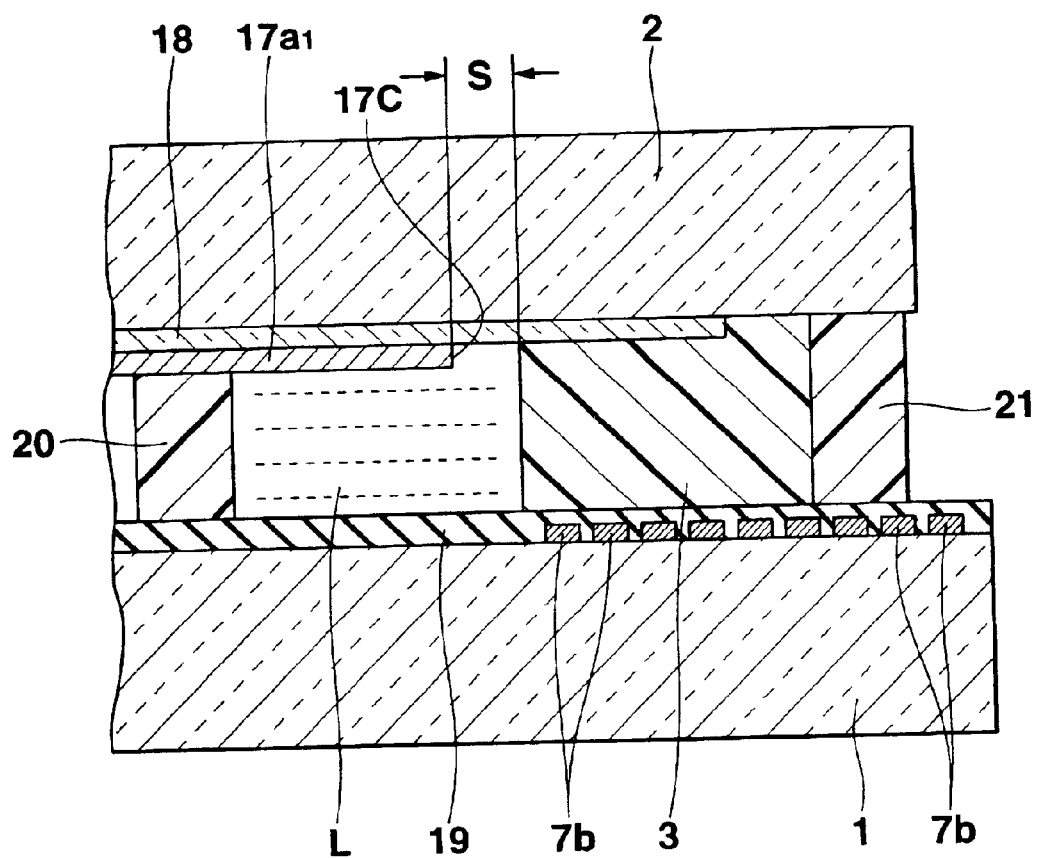
FIG. 5 is an enlarged sectional view taken along line V—V in FIG. 1.

FIG. 1 is a transparent plan view showing a main portion of a liquid crystal display device according to a first embodiment of the present invention in an equivalent circuit manner, and FIG. 5 is an enlarged sectional view taken along line V—V in FIG. 1.

The liquid crystal display device is structured such that an active substrate 1 and an opposing substrate 2 positioned above the active substrate 1 are bonded to each other via a generally rectangular sealing member 3, and liquid crystal L (refer to FIG. 5) is sealed inside the sealing member 3 between both the substrates 1 and 2. In this case, a lower side portion of the active substrate 1 projects beyond the opposing substrate 2. This projecting portion is referred to as a lower side projecting portion 1a. Also, the sealing member 3 is arranged outside a display area 4 shown with a dotted chain line in FIG. 1.

A plurality of scanning signal lines 5 and a plurality of data signal lines 6 respectively extend in a row direction and in a column direction on the display area 4 on the active substrate 1, that is, the former and the latter are provided so as to be crossed to each other perpendicularly. Near respective crossing points between both the lines 5 and 6, thin film transistors (not shown) connected to both the lines 5 and 6 and pixel electrodes (not shown) driven by the thin film transistors are arranged in a matrix manner.

A right end portions of the scanning signal lines 5 are connected via leading lines 7 provided at a right side thereof to output side connection terminals (scanning signal terminals) 9 of a semiconductor integrated circuit device 8 for scanning line drive which is shown with a dotted line on the right side and which is mounted on the lower side projecting portion 1a of the active substrate 1. The lower end portions of the data signal lines 6 are connected via leading lines 10 provided at a lower side thereof to output side connection terminals (data signal terminals) 12 of a semiconductor integrated circuit device 11 for driving data lines which is shown with a dotted line on the left side and which is mounted on the lower side projecting portion 1a of the active substrate 1. In FIG. 1, only two lines of each of the leading lines 7 and the leading lines 10 are illustrated, representably.

External connection terminals 14 are connected to input side connection terminals 13 of the semiconductor integrated circuit device 8. The semiconductor integrated circuit device 8 serves so as to supply scanning signals to the scanning lines 5. External connection terminals 16 are connected to input side connection terminals 15 of the semiconductor integrated circuit device 11. The semiconductor integrated circuit device 11 serves so as to supply data signals to the data signal lines 6.

An opposing electrode 18 (refer to FIG. 5) formed of a transparent metal such as ITO, a light shielding film 17, and color filters (not shown) are provided on a back surface of the opposing substrate 2. The opposing electrode 18 is formed on the entire inner face of the opposing substrate 2 in a solid manner. The light shielding film 17 is formed on the opposing electrode 18, and it is provided with a peripheral portion 17a surrounding a peripheral edge of the display area 4 and a matrix portion 17b formed in a grating manner so as to correspond to the scanning signal lines 5 and the data signal lines 6. In FIG. 1, only a few portions of the matrix portion 17b are illustrated for simplification of the figure. The matrix portion 17b of the light shielding film 17 surrounds respective pixel electrodes to form respective pixels. Each color filter of R, G, B is provided so as to correspond to each pixel between the opposing substrate 2 and the opposing electrode 18. The light shielding film 17 is formed in a rectangular frame shape with a width of several mm, and it is superimposed on the opposing electrode 18 to be set to the same potential as the opposing electrode 18. The peripheral portion 17a of the light shielding film 17 has a right side edge portion 17a1, a left side edge portion 17a2, an upper side edge portion 17a3 and a lower side edge portion 17a4. The left side edge portion 17a2, the upper side edge portion 17a3 and the lower side edge portion 17a4 are wider than the sealing member 3 (except for one portion of a liquid crystal pouring port forming portion 3a), and they cover the entire of the sealing member 3 so as to extend from the inside thereof to the outside thereof. However, the right side edge portion 17a1 of the light shielding film 17 is positioned inside the sealing member 3 and it does not have any overlapping portion with the sealing member 3.

Next, partial lines of the leading lines 7 connecting the right end portions of the scanning signal lines 5 and the output side connection terminals 9 to each other will be explained with reference to FIG. 2. Each leading line 7 has an extension portion 7a positioned on an extension line of the scanning signal line 5 and a perpendicularly crossing portion 7b which perpendicularly crosses the extension portion 7a. In this case, the pitch of the extension portions 7a is the same as the pitch of the scanning lines 5 but the pitch of the perpendicularly crossing portions 7b is smaller than that of the scanning signal lines 5. Partial points of the respective crossing points 7c of the leading lines 7 between the respective extension portions 7a and the respective perpendicularly crossing portions 7b are formed on an area which overlaps with the sealing member 3 and the remaining points thereof are formed on an area which does not overlap with the sealing member 3. However, all respective crossing portions 7c between the respective extension portions 7a and the respective perpendicularly crossing portions 7b are formed outside the outer side edge 17c of the right side edge portion 17a1 of the light shielding film 17, and they are not formed on an area overlapping with the right side edge portion 17a1 of the light shielding film 17.

Here, the reason why it is desirable that the respective crossing points 7c between the respective extension portions 7a of the leading lines 7 and the respective perpendicularly crossing portions 7b are not formed on the area overlapping with the right side edge portion 17a1 of the light shielding film 17 will be explained below.

When the crossing points 7c bent at a right angle between the extension portions 7a of the leading lines 7 and the perpendicularly crossing portions 7b are formed on the area where the light shielding film 17 and the sealing member 3 overlap with each other, a potential difference occurs between the leading lines 7 with the same potential as the scanning signal lines 5 and the light shielding film 17 with the same potential as the opposing electrode 18. Since the scanning signal lines 5 are sequentially scanned, the electrical field based on the potential difference is concentrated on the crossing points 7c bent at a right angle between the extension portions 7a and the perpendicularly crossing portions 7b of the leading lines 7. For this reason, it has been found that ionic impurities contained in the sealing member 3 are eluted to be concentrated on the crossing points 7c of the leading lines 7c and corrosion occurs at the crossing points 7c of the leading lines 7. Accordingly, as the above embodiments, the respective crossing points 7c between the respective extension portions 7a and the respective perpendicularly crossing portions 7b of the leading lines 7 are not formed on the area where the right side edge portion 17a1 of the light shielding film 17 and the sealing member 3 overlap with each other, so that corrosion of the leading lines 7 can be prevented from occurring due to the potential difference between the scanning signal lines 5 and the light shielding film 17.

Here, a space S between the outer side edge 17c of the right side edge portion 17a1 of the light shielding film 17 and the sealing member 3 is made smaller than the width Ws of the sealing member 3, and this space S should be made small for preventing light leakage. The space S is desirable to be about 0.2 mm or less.

Figure 2:
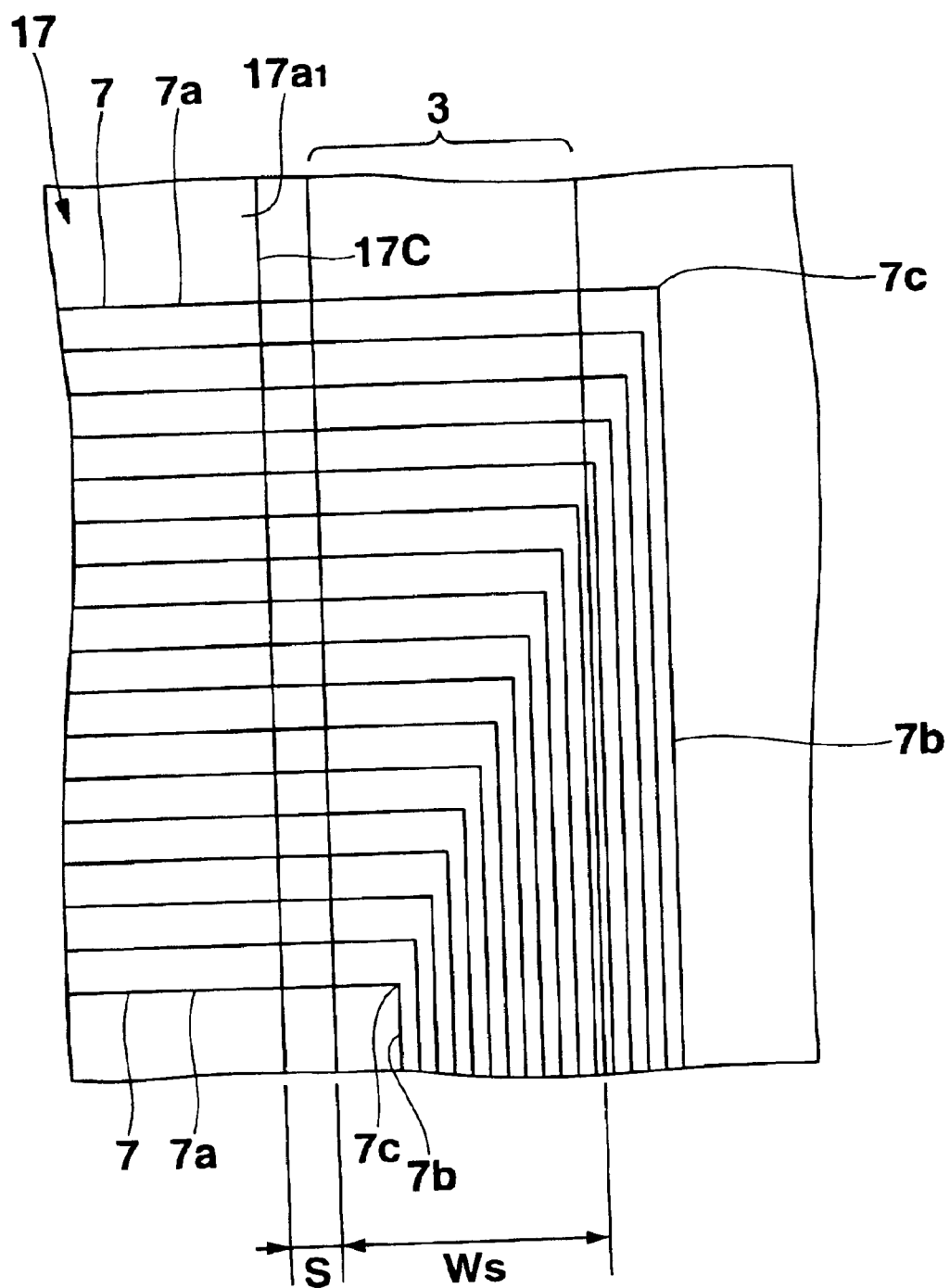
FIG. 2 is an enlarged plan view showing a portion of the liquid crystal display device shown in FIG. 1.
Figure 3:
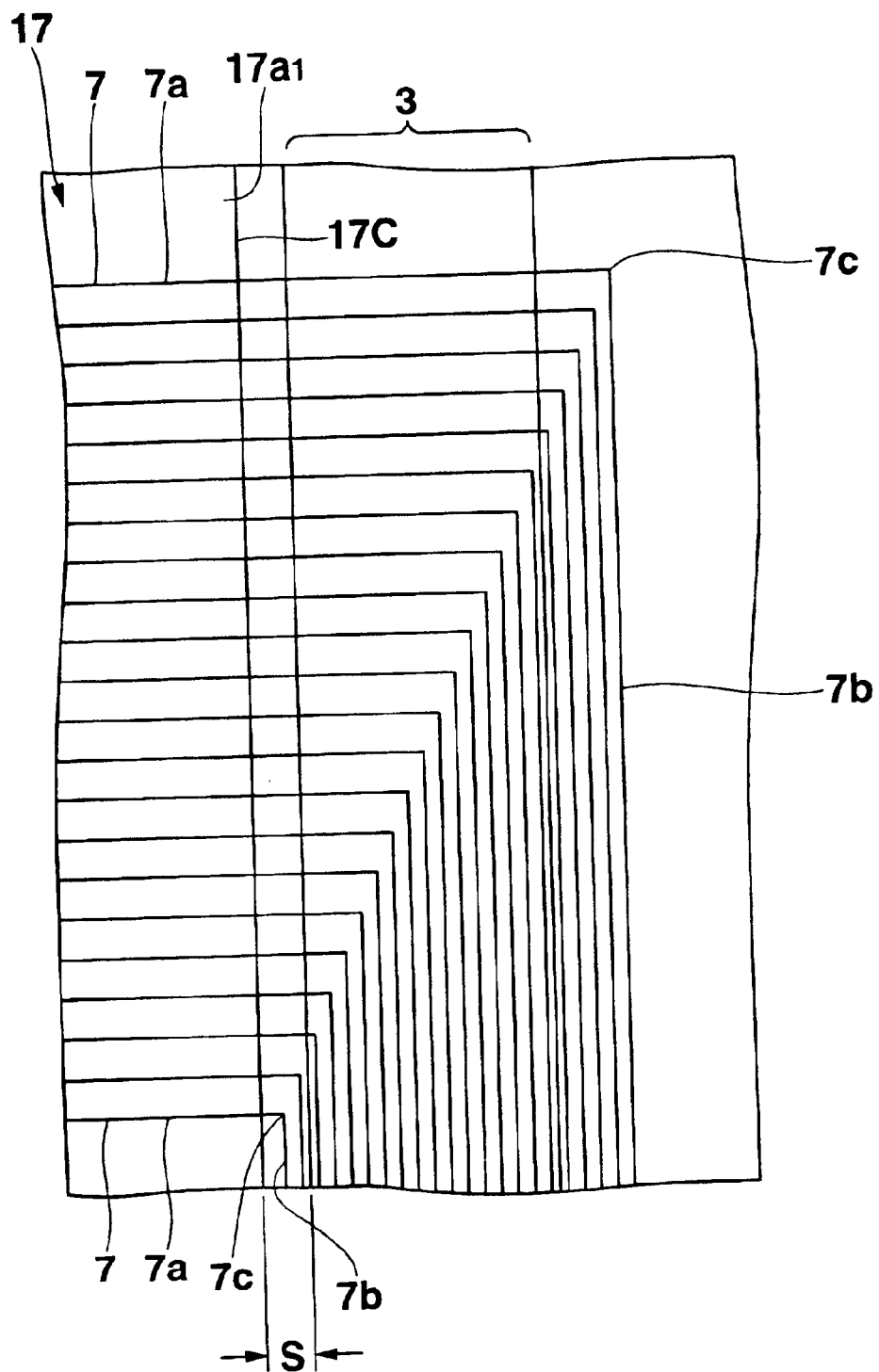
FIG. 3 is an enlarged plan view showing a modified embodiment of the liquid crystal display device shown in FIG. 2.

Incidentally, FIG. 3 shows a modified embodiment of the embodiment in FIG. 2. In this modified embodiment, partial portions of the crossing portions 7b of the leading lines 7 are formed within the space S between the right side edge portion 17a1 of the light shielding film 17 and the sealing member 3. Even in this case, no crossing points 7c of the leading lines 7 are overlapped on the right side edge portion 17a1 of the light shielding film 17.

Figure 4:
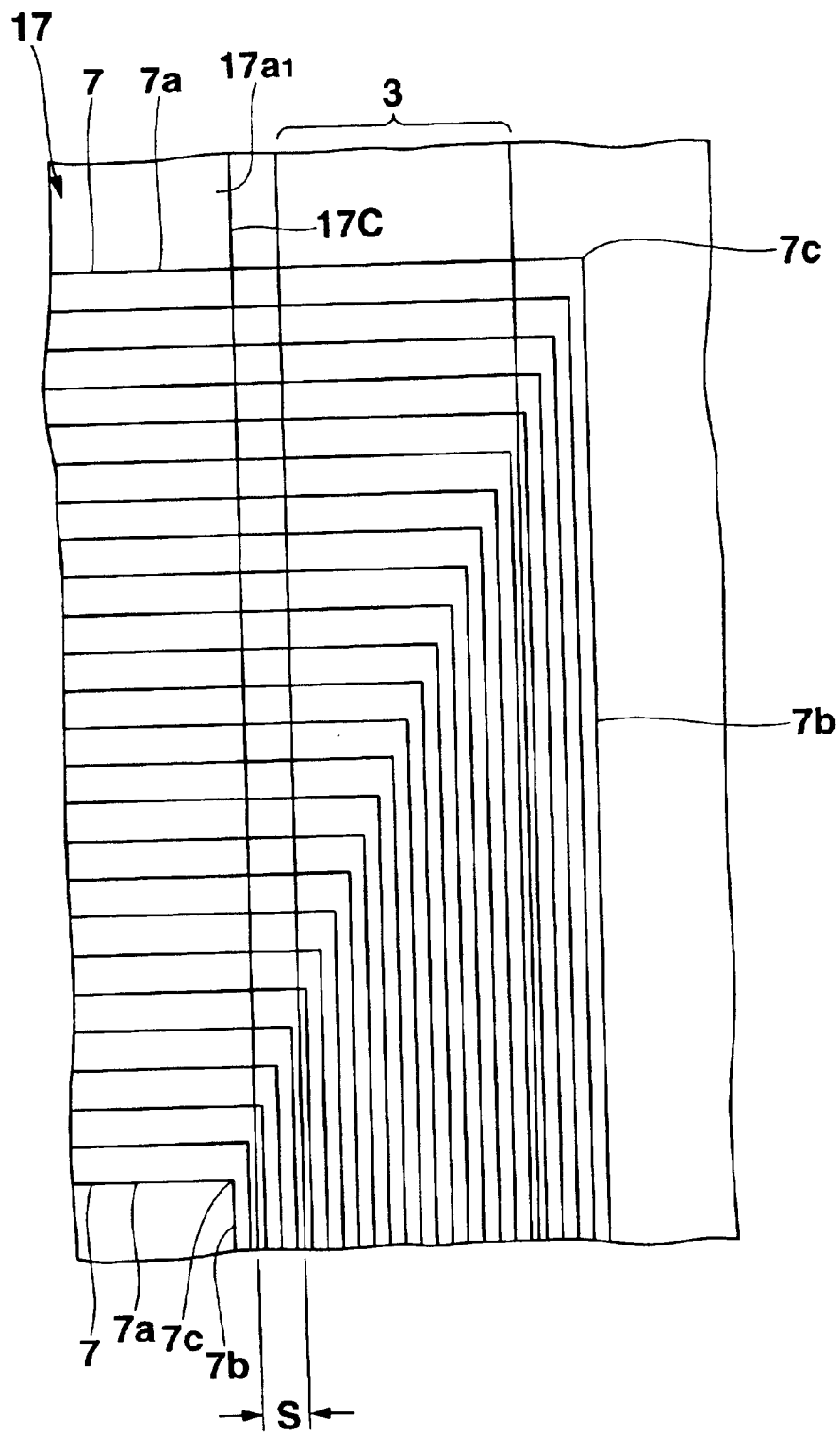
FIG. 4 is an enlarged plan view showing another modified embodiment of the liquid crystal display device shown in FIG. 2.

Also, FIG. 4 shows another modified embodiment of the embodiment in FIG. 2. In this modified embodiment, partial portions of the crossing portions 7b of the leading lines 7 are formed on the area overlapping on the right side edge portion 17a1 of the light shielding film 17. However, the sealing member 3 is not formed on this area. Accordingly, corrosion of the leading lines 7 does not occur due to ionic impurities contained in the sealing member. Even in this modified embodiment, the right side edge portion 17a1 of the light shielding film 17 is not overlapped on the sealing member 3 so that corrosion is prevented from occurring in the leading lines 7 formed on the area overlapping on the sealing member 3. Incidentally, in FIGS. 2, 3 and 4, the numbers of the leading lines 7 are illustrated so as to be different from one another, which is merely for drawing easiness.

Next, the explanation regarding FIG. 5 will be made in an additional manner.

As described above, the active substrate 1 and the opposing substrate 2 are bonded to each other via a generally rectangular frame-shaped sealing member 3. The opposing electrode 18 formed of ITO or the like is formed on the inner face of the opposing substrate 2. Formed on the opposing electrode 18 is the light shielding film 17 having the peripheral portion 17a and the matrix portion 17b (not shown in FIG. 5). The perpendicularly crossing portions 7b of the leading lines 7 connected to the scanning signal lines 5 are formed on the active substrate 1, and upper portions thereof are covered on a passivation film 19. Thin film transistors (not shown) are formed on the active substrate 1, and orientation films are formed on the opposing electrode 18 of the opposing substrate 2 and on the passivation film 19 on the active substrate 1. Column-shaped spacers 20 made of resin are interposed between the active substrate 1 and the opposing substrate 2 inside the sealing member 3, and liquid crystal L is sealed inside the sealing member 3 between the active substrate 1 and the opposing substrate 2. Here, as one feature, the present invention has a structure that a seal member diffusion preventing wall 21 made of the same resin as the spacer 20 is provided outside the sealing member 3 between the active substrate 1 and the opposing substrate 2. The sealing member 3 is ordinarily formed by drawing material for sealing member by means of a dispenser or the like. However, since the width and the height of the sealing member vary at the time of drawing, undulation of about 0.15 mm or so occurs on the sealing member 3 in its widthwise direction after the active substrate 1 and the opposing substrate 2 are bonded to each other by thermocompression bonding. For this reason, when a large size substrate are cut to individual liquid crystal display devices, the width of the liquid crystal display device becomes large corresponding to the variations in width of the sealing member 3, which results in increase in size of an electronic equipment such as a portable telephone or the like. The seal member diffusion preventing wall 21 has a function for preventing outward fluidization of the sealing member 3 when the active substrate 1 and the opposing substrate 2 are bonded to each other, so that the widthwise size of the liquid crystal display device can be reduced.

Next, a part of a method for manufacturing this liquid crystal display device will be explained. When the column-shaped spacers 20 and the sealing member diffusion preventing wall 21 are formed, first, a resin film is applied so as to have a fixed thickness on an upper face of a large-sized glass substrate (not shown) for forming a plurality of active substrates 1 by a spin coating process or the like. In this case, the thickness of the resin film is made equal to the height of the column-shaped spacer 20 to be formed. Next, by patterning the resin film by photolithography process, the column-shaped spacers 20 and the sealing member diffusion preventing wall 21 are formed. The sealing member diffusion preventing wall 21 is formed in a rectangular frame shape surrounding the outer periphery of the sealing member 3 to be formed thereafter.

In this case, the heights of the spacers 20 and the sealing member diffusion preventing wall 21 are determined according to the thickness of the resin film applied, and they are equal, for example, 5 μm. Also, since the photolithography process allows fine patterning, such a setting can be employed as one example that the cross section of the spacer 20 is about 15 μm square and the width of the sealing member diffusion preventing wall 21 is about 15 μm. Furthermore, a formation position of the sealing member diffusion preventing wall 21 is set so as to approach to a cutting line of the large-sized glass substrate as close as possible.

Sealing member material is drawn just inside the sealing member diffusion preventing wall 21 on the upper face of the large-sized glass substrate by a dispenser process, thereby forming the sealing member 3. Next, the large-sized glass substrate and another large-sized glass substrate (not shown) for forming a plurality of the opposing substrate 2 are attached to each other via the sealing member 3 by thermo-compression bonding. In this case, the sealing member 3 can be prevented from being fluidized outward by the sealing member diffusion preventing wall 21, so that variations can be prevented from occurring in the outer side of the sealing member 3 in the widthwise direction thereof. Next, when the both large-sized glass substrates are cut along cutting lines, a plurality of liquid crystal display cells can be obtained. Next, when the liquid crystal display cells are sealed with liquid crystal L, liquid crystal display devices can be obtained.

In the liquid crystal display device thus obtained, since such a structure is employed that the outer periphery edge of the sealing member 3 in the widthwise direction is prevented from varying by preventing the sealing member 3 from diffusing outwardly unnecessarily by the sealing member diffusion preventing wall 21, even when the sealing member 3 is formed nearer to respective end edges (cutting lines of the large-sized glass substrates) of the active substrate 1 and the opposing substrate 2, the sealing member 3 is not positioned on the cutting line of the large-size glass substrate. That is, conventionally, the formation position of the sealing member 3 has been set to a position spaced from the end edge of the opposing substrate 2 by 0.15 mm (150 μm) or more. In this embodiment, however, the sealing member diffusion preventing wall 21 with about 15 μm width is formed at a position close to the end edge of the opposing substrate 2, and the sealing member 3 is formed just inside the wall 21, so that the width of the edge portion of the liquid crystal display device can be reduced to the maximum 150−15=135 μm or so. In the liquid crystal display device shown in FIG. 1, since the leading lines 7 are not formed on the left side, it is possible to cut the active substrate 1 at the same position as the opposing substrate 2. With the above configuration, the widthwise size of the liquid crystal display device can further be reduced.

Second Embodiment

Figure 6:
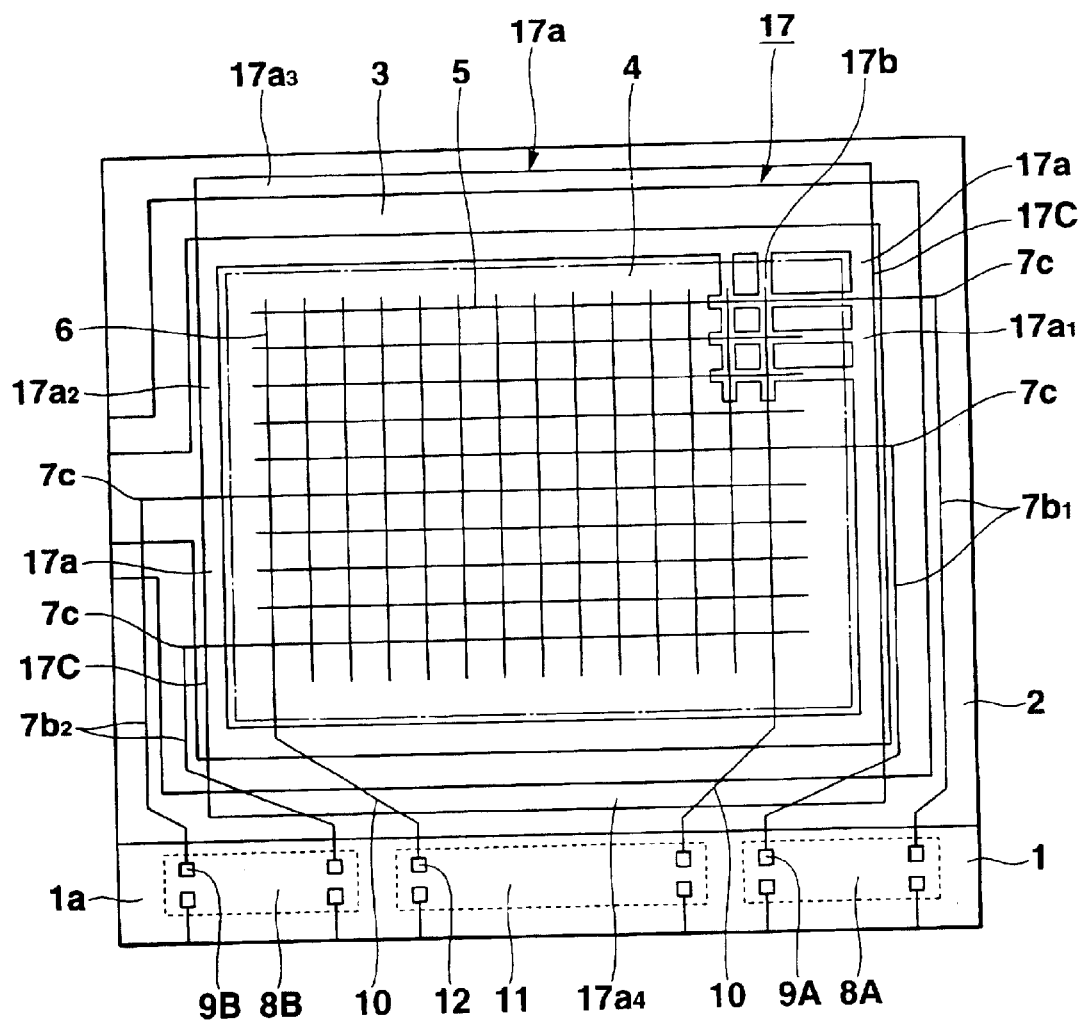
FIG. 6 is a transparent plan view showing a liquid crystal display device according to a second embodiment of the present invention in an equivalent circuit manner.

In the first embodiment, as shown in FIG. 1, the explanation about the case where the leading lines 7 are positioned only on the right side portion of the active substrate 1 has been made, but this invention is not limited to such an embodiment. For example, the present invention may be structured as a second embodiment shown in FIG. 6. That is, in this embodiment, the semiconductor integrated circuit device 11 for data line drive is mounted on a central portion of the lower side projecting portion 1a of the active substrate 1, and semiconductor integrated circuit devices 8A and 8B for scanning line drive are mounted on both sides thereof. A right end portions of approximately an upper half members of the scanning lines 5 are connected via leading lines 7b1 provided on a right side to output side connection terminals 9A of the semiconductor integrated circuit device 8A shown with a dotted line on the right side, which is mounted the lower side projecting section 1a of the active substrate 1. A left end portions of approximately a lower half members of the scanning lines 5 are connected via leading lines 7b2 provided on a left side to output side connection terminals 9B of the semiconductor integrated circuit device 8B shown with a dotted line on the left side, which is mounted the lower side projecting section 1a of the active substrate 1. In the above, only two lines of each of the leading lines 7b1 and the leading lines 7b2 are respectively illustrated.

In this case, the light shielding film 17 is arranged such that both right side edge portion 17a1 and left side edge portion 17a2 of the peripheral portion 17a thereof are positioned inside the sealing member 3. That is, the crossing points 7c of the right side leading lines 7b1 are arranged outside the outer edge 17c of the right side edge portion 17a1 of the light shielding film 17, and the crossing points 7c of the left side leading lines 7b2 are arranged outside the outer edge 17c of the left side edge portion 17a2 of the light shielding film 17. In the second embodiment of the present invention shown in FIG. 6, the semiconductor integrated circuit device 11 for data line drive is mounted at a central portion on the lower side projecting portion 1a of the active substrate 1, the semiconductor integrated circuit devices 8A and 8B for scanning line drive are mounted on both sides of the semiconductor integrated circuit device 11, and almost halves of the scanning signal lines 5 are respectively connected to the left and right semi-conductor integrated circuit devices 8A and 8B for scanning line drive via the leading lines 7b1 and 7b2, which are formed on the side edge portions of the active substrate 1 on which the sealing member 3 is formed, in at least partially overlapping manner on the sealing member 3. Therefore, a portion of the active substrate 1 which is positioned outside the sealing member 3 can be reduced, which allows reduction of left and right side widths in the active substrate 1. In this case, when the light shielding film 17 is formed of resin, the peripheral portion 17a of the light shielding film 17 can be formed so as to overlap on the crossing points 7c between the leading lines 7b1 and 7b2 and the sealing member 3.

As one example, assuming that the number of the scanning signal lines 5 is 220 and the pitch of the leading lines 7b1 and 7b2 is 20 μm, the width required for forming the leading lines 7b1 and 7b2 may be 2.2 mm as obtained by the following equation.

$$220 \times \frac{1}{2} \times 20 \text{ μm} = 2.2 \text{ mm}$$

In this case, the width of the sealing member 3 is about 1 mm, and when partial lines of the leading lines 7b1 and 7b2 are provided below the sealing member 3, it is sufficient for the leading lines that the size of the active substrate 1 positioned outside the sealing member 3 is 1.2 mm.

Figure 7:
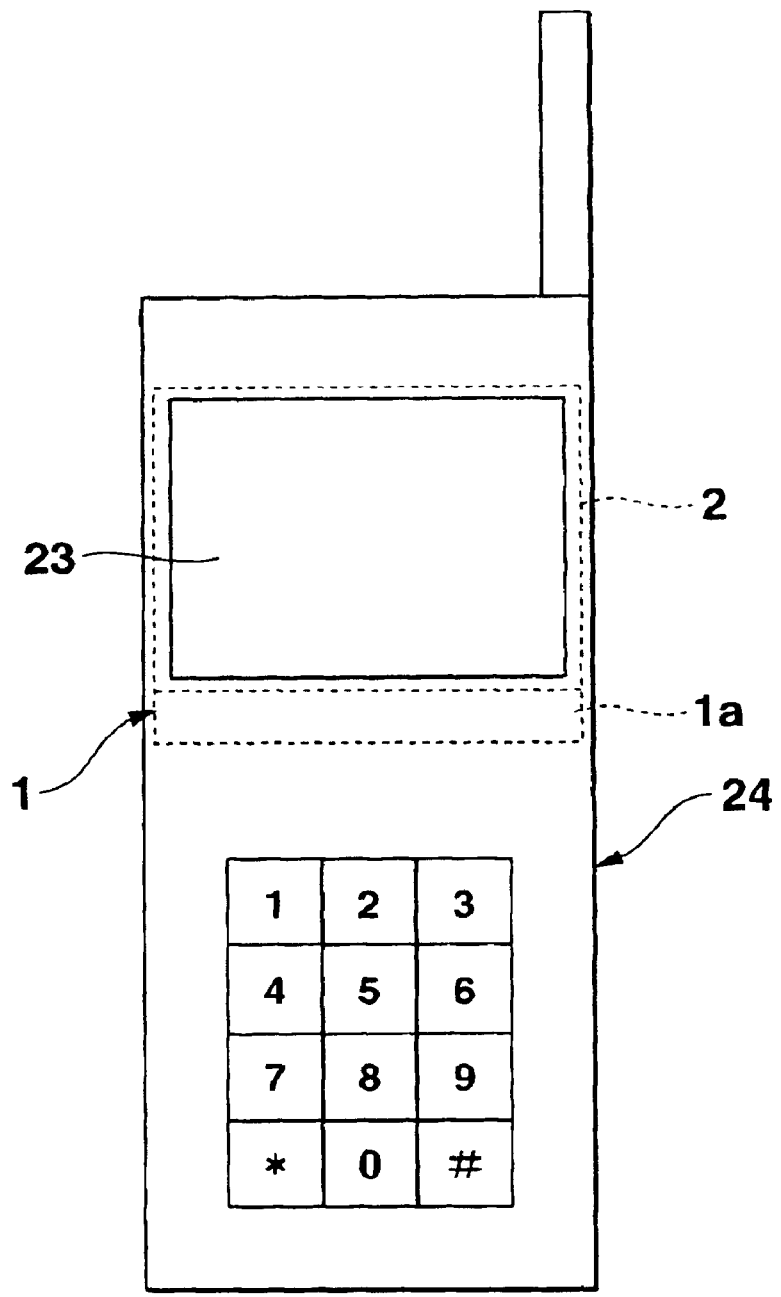
FIG. 7 is a front view of a portable telephone provided with the liquid crystal display device shown in FIG. 6.

Thus, the liquid crystal display device of the second embodiment can be formed substantially in a symmetrical shape bilaterally and the sizes of the left and right side portions can be reduced. For this reason, in a case of a portable telephone provided with this liquid crystal display device, as shown in FIG. 7, the display area 23 can be arranged at a central portion of the portable telephone main body 24 in a widthwise direction, thereby allowing improvement in design, allowing reduction of the size of the portable telephone main body 24 in a widthwise direction, and allowing improvement in portability.

Incidentally, the modified embodiments shown in FIGS. 3 and 4 can be applied to even the above second embodiment, like the first embodiment. In this case, the relationships between the right side edge portion 17a1 and the left side edge portion 17a2 of the peripheral portion 17a of the light shielding film 17, and the leading lines 7b1 and 7b2 are respectively applicable with different modified embodiments.

Also, in the above first and second embodiments, the case where the lower side portion of the active substrate 1 is caused to project beyond the opposing substrate 2 and the semiconductor integrated circuit device is mounted at the lower side projecting portion 1a has been explained, but the present invention is not limited to these embodiments. Such a structure (not shown) can be employed that only the right side portion of the active substrate 1 is caused to project beyond the opposing substrate 2 and the semiconductor integrated circuit device is mounted on the right side projecting portion. In this case, since the crossing points may be formed in the leading lines 10 connected to the data signal lines 6, leading lines to be applied with the present invention are the leading lines 10 but not leading lines 7.

Third Embodiment

Figure 8:
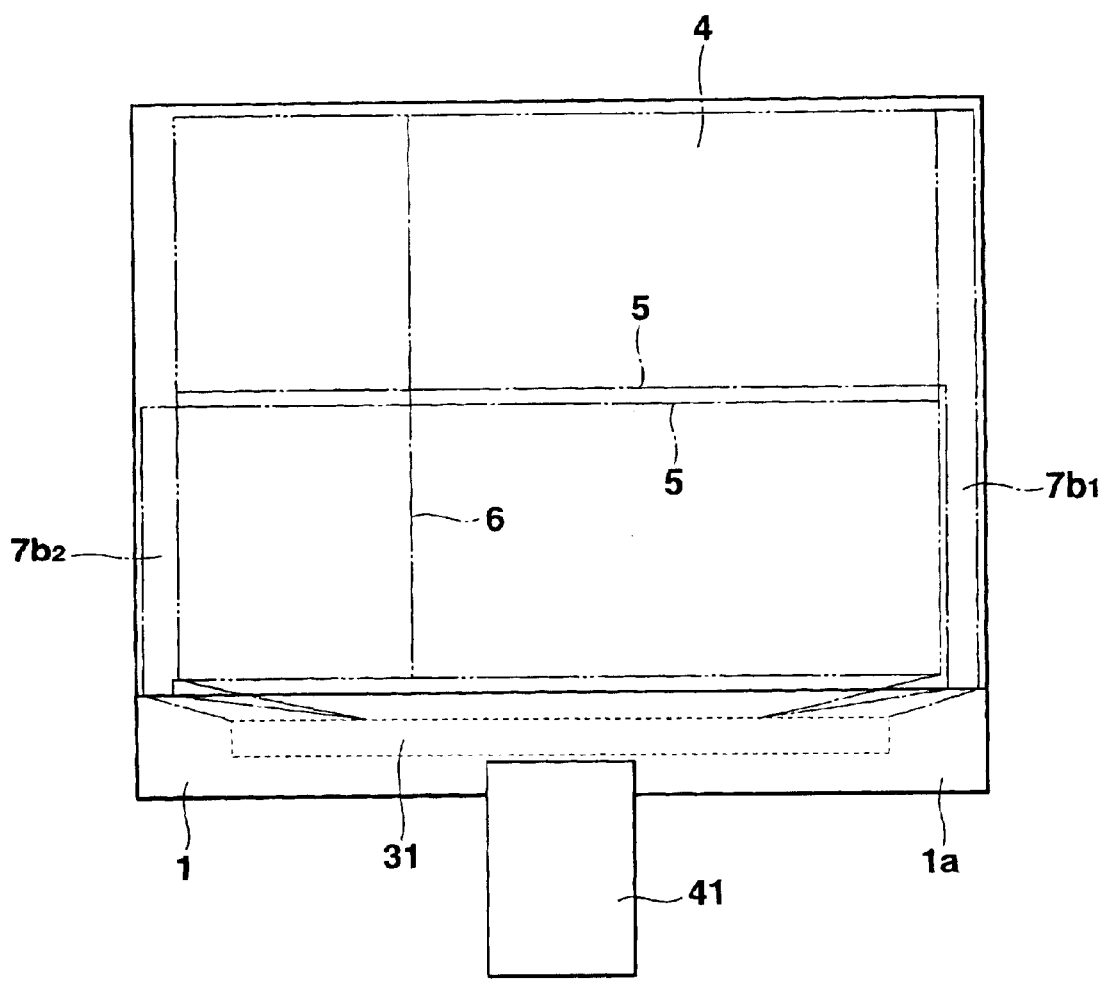
FIG. 8 is a plan view showing a schematic configuration of a liquid crystal display device according to a third embodiment of this invention.

In the above second embodiment, such a structure has been explained that the semiconductor integrated circuit device 11 for data line drive is mounted at the central portion on the lower side projecting portion 1a of the active substrate 1 and the semiconductor integrated circuit devices 8A and 8B for scanning line drive are mounted at both left and right sides of the semiconductor integrated circuit device 11, but the present invention is not limited to such an embodiment. For example, when a structure where a drive circuit portion for driving both scanning signal lines and data signal lines is provided as a semiconductor integrated circuit device is employed, the number of semiconductor integrated circuit devices to be mounted on the active substrate 1 is reduced to 1. Such an embodiment is exemplified by a third embodiment of the invention shown in FIG. 8, where one semiconductor integrated circuit device 31 for data line drive and scanning line drive is mounted on the lower side projecting portion 1a of the active substrate 1. In FIG. 8, reference numeral 41 denotes a flexible substrate bonded to input terminals (not shown) connected to the semi-conductor integrated circuit device 31.

Fourth Embodiment

Figure 9:
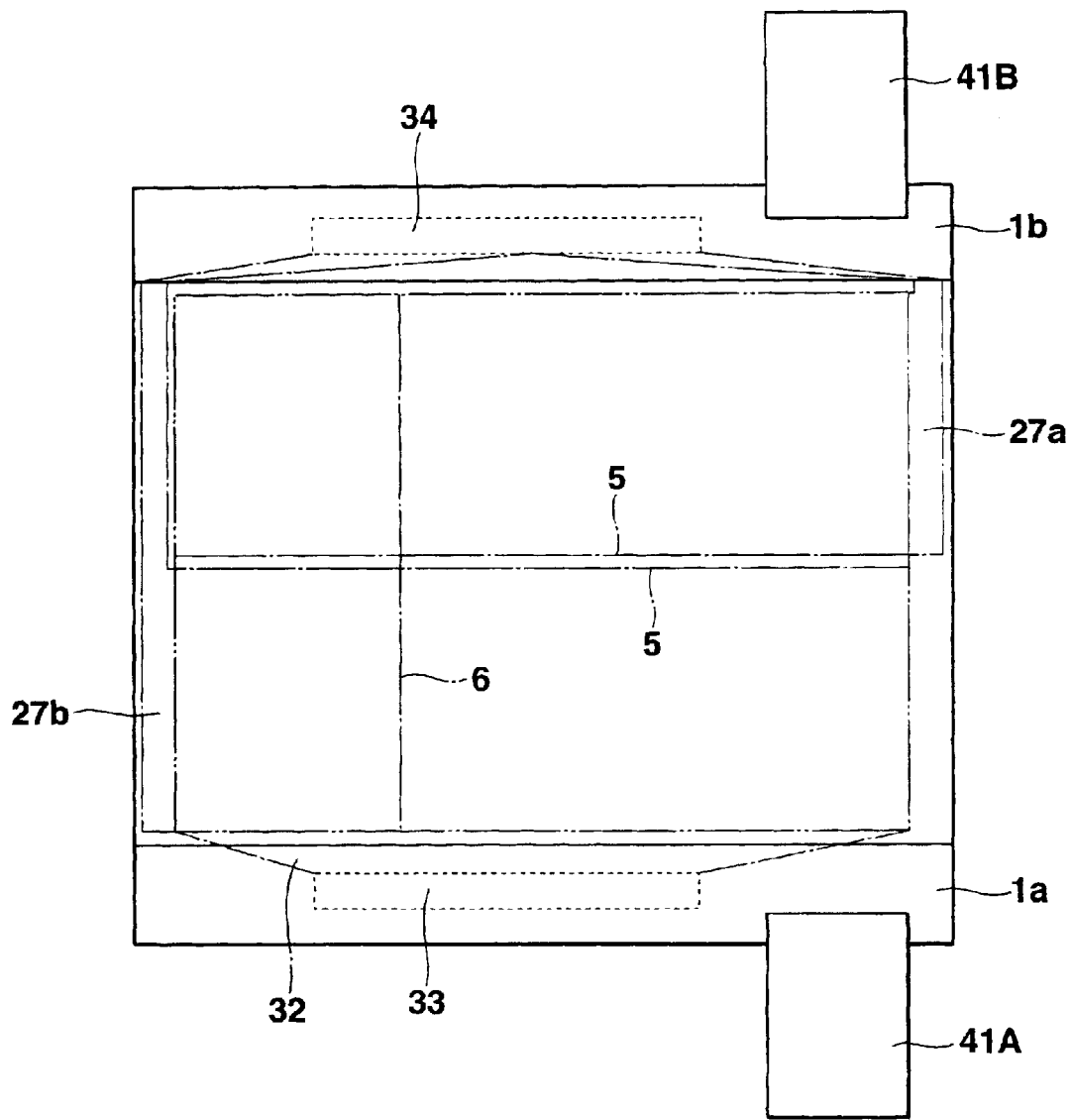
FIG. 9 is a plan view showing a schematic configuration of a liquid crystal display device according to a fourth embodiment of this invention.

In the above second embodiment, the explanation has been made about the case where only the lower side portion of the active substrate 1 is caused to project beyond the opposing substrate 2, but the present invention is not limited to such a structure. For example, a fourth embodiment shown in FIG. 9 can be employed in this invention. In this embodiment, such a structure is employed that an lower side portion and an upper side portion of the active substrate 1 are caused to project beyond the opposing substrate 2, and a semi-conductor integrated circuit device 33 for data line drive is mounted on a central portion on the lower side projecting portion 1a while a semiconductor integrated circuit device 34 for scanning line drive is mounted on a central portion on the upper side projecting portion 1b.

In this case, right end portions of approximately upper half members of the scanning signal lines 5 are connected via leading lines 27a provided on a right side thereof to output side connection terminals (not shown) of the semiconductor integrated circuit device 34, while left end portions of approximately lower half members of the scanning signal lines 5 are connected via leading lines 27b provided on a left side thereof to output side connection terminals (not shown) of the semiconductor integrated circuit device 33. Also, the lower end portions of the data signal lines 6 are connected via leading lines 32 provided on the lower side thereof to output side connection terminals (not shown) of the semiconductor integrated circuit device 33 mounted on the lower side projecting portion 1a of the active substrate 1.

Respective one end portions of flexible wiring boards 41A and 41B are joined to respective right sides of the lower side projecting portion 1a and the upper side projecting portion 1b of the active substrate 1. Input side terminals of the semiconductor integrated circuit device 33 are connected via wiring provided on the lower side projecting portion 1a to the flexible wiring board 41A (not shown). Also, input side terminals of the semiconductor integrated circuit device 34 are connected via wiring provided on the upper side projecting portion 1b to the flexible wiring board 41B (not shown).

In the case of this fourth embodiment, since the upper side projecting portion 1b is provided, the size of the liquid crystal display device in up and down directions (longitudinal direction) is increased. However, the basic shape of the liquid crystal display device in the widthwise direction can be made symmetrical and the size of the liquid crystal display device in the widthwise direction can be reduced like the above second embodiment.

Fifth Embodiment

Figure 10:
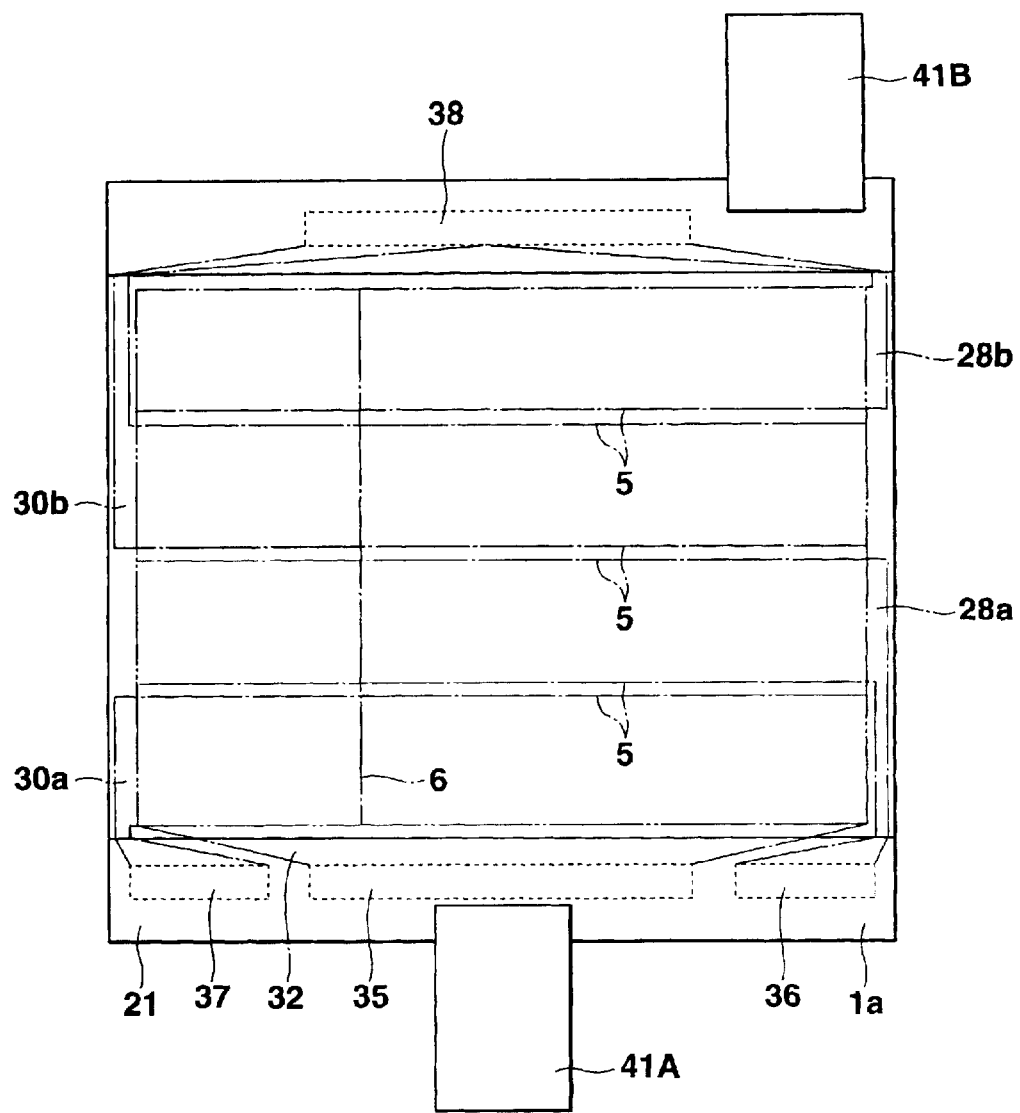
FIG. 10 is a plan view showing a schematic configuration of a liquid crystal display device according to a fifth embodiment of this invention.
Figure 11:
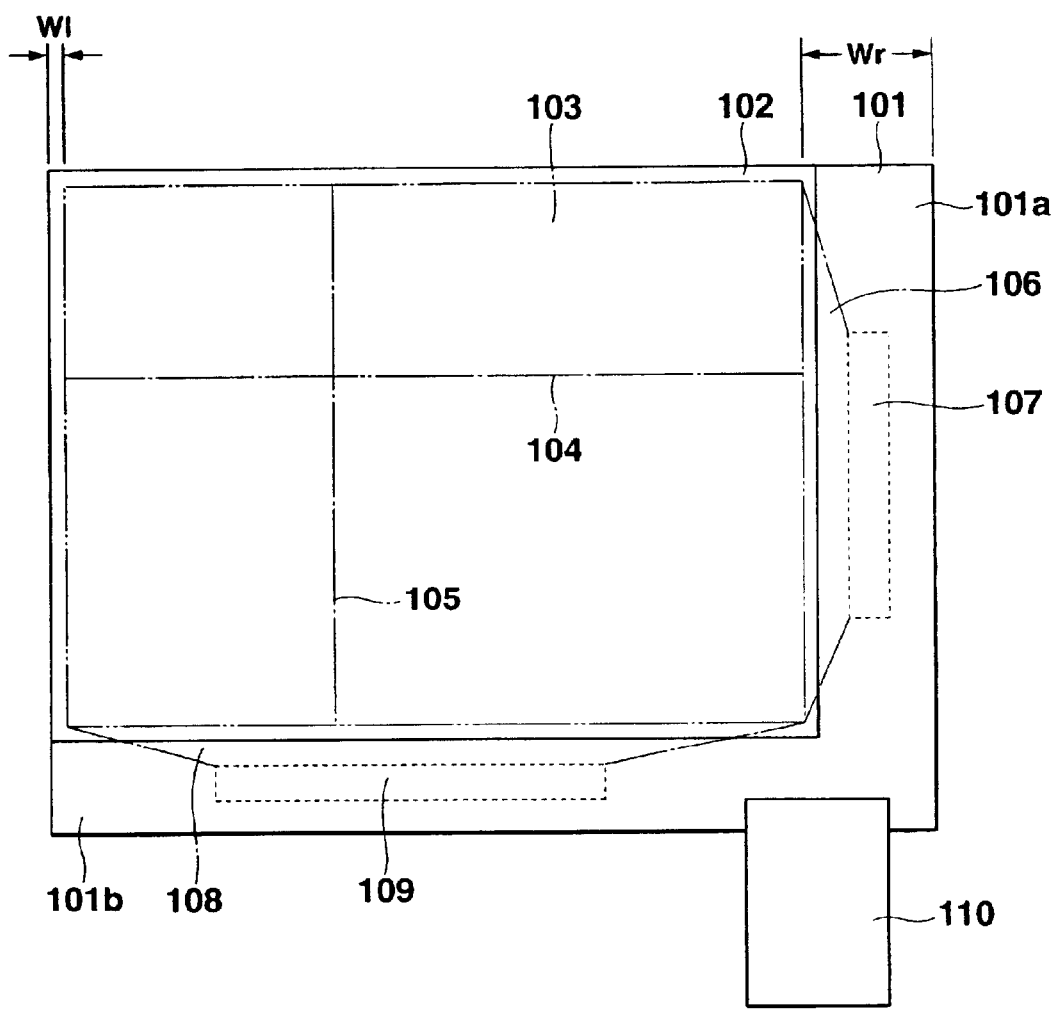
FIG. 11 is a plan view showing a schematic configuration of a conventional liquid crystal display device.

In the above fourth embodiment, such a structure has been employed that the semiconductor integrated circuit device 33 mounted on the lower side projecting portion 1c of the active substrate 1 is used only for data line drive, but the present invention may be structured such that the semiconductor integrated circuit device for data line drive and the semiconductor integrated circuit device for scanning line drive are mounted on the lower side projecting portion 1a. Such an embodiment is exemplified as a fifth embodiment of the invention shown in FIG. 10. In the case of this embodiment, a semiconductor integrated circuit device 35 for data line drive is mounted at a central portion on the lower side projecting portion 1c of the active substrate 1, semiconductor integrated circuits 36 and 37 for scanning line drive are mounted on both sides thereof, and a semiconductor integrated circuit device 38 for scanning line drive is mounted at a central portion on the upper side projecting portion 1b.

In this case, right end portions of approximately upper half members (¼ in the whole lines) in approximately lower half members of the scanning signal lines 5 are connected via leading lines 28a provided on a right side thereof to output side connection terminals (not shown) of the semi-conductor integrated circuit device 36, and left end portions of approximately lower half members in approximately lower half members of the scanning signal lines 5 are connected via leading lines 30a provided on a left side thereof to output side connection terminals (not shown) of the semiconductor integrated circuit device 37.

Also, right end portions of approximately upper half members in approximately upper half members of the scanning signal lines 5 are connected via leading lines 28b provided on a right side thereof to output side connection terminals (not shown) of the semiconductor integrated circuit device 38, and left end portions of approximately lower half members in approximately upper half members of the scanning signal lines 5 are connected via leading lines 30b provided on a left side thereof to output side connection terminals (not shown) of the semiconductor integrated circuit device 38. The lower end portions of the data signal lines 6 are connected via leading lines 32 provided on a lower side thereof to output side connection terminals (not shown) of the semiconductor integrated circuit device 35 mounted on the lower side projecting portion 1a of the active substrate 1.

Respective one end portions of flexible wiring board 41A and 41B are joined to the central portion of the lower side projecting portion 1a and the right side of the upper side projecting portion 1b of the active substrate 1. The input side connection terminals of he semiconductor integrated circuit devices 35, 36 and 37 are connected via wiring provided on the lower side projecting portion 1a to the flexible wiring board 41A, and the input side connection terminals of the semiconductor integrated circuit device 38 are connected via wiring (not shown) provided on the upper side projecting portion 1b to the flexible wiring board 41B.

Thus, in this fifth embodiment, the lines of approximately lower half members of the scanning signal lines 5 are connected via the leading lines 28a and 30a to the output side connection terminals of the semiconductor integrated circuit devices 36 and 37 mounded on the lower side projecting portion 1a of the active substrate 1, and the lines of approximately upper half members of the scanning signal lines 5 are connected via the leading lines 28b and 30b to the output side connection terminals of the semiconductor integrated circuit device 38 mounted on the upper side projecting portion 1b of the active substrate 1, so that the widthwise size of the liquid crystal display device can further be reduced.

As one example, assuming that the number of the scanning signal lines is 220, and the pitch of the leading lines 28a, 28b, 30a and 30b is set to 20 μm, the width required for forming leading lines may be 1.1 mm or so as obtained according to the following equation.

$$220 \times \frac{1}{4} \times 20 \, \mu m = 1.1 \, mm$$

Accordingly, it becomes possible to arrange almost all the leading lines below the sealing member. Of course, the leading lines 28a, 30a, 28b and 30b may be arranged outside the sealing member. Even in this case, the respective widths of non-display areas on both left and right sides of the active substrate 1 may be 2.1 mm or so.

Incidentally, in the above fifth embodiment, one semiconductor integrated circuit device for data line drive and scanning line drive may be mounted on the lower side projecting portion 1a of the active substrate 1, like the case of the third embodiment shown in FIG. 8. Also, in the above second to fifth embodiments, such a structure may be employed that the scanning signal lines 5 are alternately connected to the right side leading lines and the left side leading lines by one by one. Also, a semiconductor integrated circuit for scanning line drive and for data line drive may be configured by thin film transistors formed directly on the active substrate 1 instead of mounting of the semiconductor integrated circuit device. Furthermore, in the above embodiments, the case that the entire display area is of the active matrix type has been explained. In this invention, however, a portion of the display area may be configured by a character display area, and even in a case except for such a display form, the numbers of leading lines formed on both the sides of the display area are not made equal to each other necessarily.

As described above, according to the present invention, since the central portion of the active substrate in the row direction is defined as the display area, and both side portions thereof in the row direction are defined as leading line formation areas for scanning signal lines, when the two leading line formation areas are made equal to each other, the basic shape of the liquid crystal display device in the widthwise direction can be made symmetrical. Also, such a structure has been employed that the crossing points of the leading lines of one side arranged on the area overlapping on the sealing member are not opposed to the peripheral portion of the light shielding film, ionic impurities eluted from the sealing member can be prevented from being concentrated on the crossing points of the leading lines of the one side, so that corrosion of the crossing points of the leading lines of the one side can be prevented from occurring due to the ionic impurities eluted from the sealing member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   a first substrate;
   a second substrate having a face opposing the first substrate;
   a frame-shaped sealing member which bonds the first and second substrates to each other, and having a first side portion, the first and second substrates and sealing member defining a space;
   liquid crystal which is sealed in the space defined by the first and second substrates and the sealing member;
   a plurality of first wires, a plurality of second wires formed in a direction perpendicular to the first wires, and a plurality of leading wires including extension portions which extend generally in parallel to the first wires and which are connected to the first wires, crossing portions which are generally perpendicular to the extension portions and which are respectively connected to a corresponding one of the second wires, the extension portions and the crossing portions being coupled and respectively defining cross points, at least some of the cross points overlapping with the first side portion of the sealing member, and
   a frame-shaped light shielding film defining a display area and being disposed on the first substrate, the light shielding film being disposed so as not to overlap with some of the cross points and the first side portion of the sealing member.

2. A liquid crystal display device according to claim 1, wherein the second substrate has one side portion which is not opposed to the first substrate and an integrated circuit connected to the plurality of first wires and the plurality of leading wires is on the one side portion.

3. A liquid crystal display device according to claim 1, wherein the light shielding film is spaced from the first side portion of the sealing member by a distance of 0.2 mm or less.

4. A liquid crystal display device according to claim 1, further comprising a sealing member diffusion preventing wall provided outside the sealing member.

5. A liquid crystal display device according to claim 4, further comprising a spacer disposed between the first substrate and the second substrate, wherein the spacer comprises the same material as the sealing member diffusion preventing wall.

6. A liquid crystal display device according to claim 1, wherein the first substrate has a first electrode, the second substrate has a second electrode opposing the first electrode, and the light shielding film is set to the same potential as the second electrode.

* * * * *